United States Patent [19]

Ticks et al.

[11] Patent Number: 4,632,370
[45] Date of Patent: Dec. 30, 1986

[54] HYDRAULICALLY-DAMPED MOUNT

[75] Inventors: Gerd-Heinz Ticks, Waldmichelbach; Volker Grassmuck, Weinheim, both of Fed. Rep. of Germany

[73] Assignee: Firma Carl Freudenberg, Weinheim an der Bergstrasse, Fed. Rep. of Germany

[21] Appl. No.: 622,854

[22] Filed: Jun. 21, 1984

[30] Foreign Application Priority Data

Aug. 24, 1983 [DE] Fed. Rep. of Germany ....... 3330462

[51] Int. Cl.$^4$ .............................................. F16F 9/08
[52] U.S. Cl. .................................... 267/8 R; 267/35; 267/140.1; 267/152
[58] Field of Search ............ 267/8 R, 35, 63 R, 63 A, 267/122, 134, 140.1, 64.23, 64.24, 152; 188/378, 379, 380, 298; 248/562, 636

[56] References Cited

U.S. PATENT DOCUMENTS 2,387,066 10/1945 Harding .......................... 188/298 X
3,368,807 2/1968 Thrasher .......................... 188/298 X
4,399,987 8/1983 Cucelli et al. ..................... 267/140.1

Primary Examiner—George E. A. Halvosa
Assistant Examiner—Richard R. Diefendorf
Attorney, Agent, or Firm—Felfe & Lynch

[57] ABSTRACT

A mount for damping vibratory motion has a resilient pad which is flexed by the motion to move relatively spaced bumper and counter shoulders for resiliently damping vibrations having amplitudes less than the spacing of the shoulders. Low frequency vibrations with larger amplitudes are damped hydraulically by a diaphragm arrangement operated by engagement of the shoulders and throttling an hydraulic fluid between working and expansion spaces enclosed thereby. The diaphragm arrangement is spaced from the resilient pad so that the pad- and hydraulic-damping operate independently. The shoulders are also outside the enclosed space for the hydraulic fluid to be similarly independent thereof.

20 Claims, 12 Drawing Figures

HYDRAULICALLY-DAMPED MOUNT

BACKGROUND OF THE INVENTION

The invention relates to an hydraulically-damped mount and, more particularly, an engine mount for a motor vehicle.

An hydraulically-damped engine mount is known from U.S. Pat. No. 2,387,066. In it, a resilient pad or element directly bounds a working space for the hydraulic fluid. When high frequency vibrations are introduced, therefore, dynamic induration (hardening) can occur with the vibrations then being transmitted through the engine mount. In a motor vehicle, in particular example, such vibrations from the engine can be a great nuisance in the form of throbbing in the vehicle.

Also in the hydraulic mount described in the patent reference above, initial-movement-delimiting bumper shoulders and counter shoulders are in the working space for the hydraulic fluid and sweep a large enough volume of the fluid with their relative motion in response to vibrations to impair their relative mobility and, thus, the damping. This also churningly stresses the hydraulic fluid. The noise of so accelerating the hydraulic fluid, including, possibly, from cavitation, can also be a nuisance in some applications. Still another disadvantage is that changes in the contours of the resilient pad defining part of the hydraulic fluid space with the motion to be damped may decrease the desired hydraulic damping significantly. For example, such motional changes in the shape of local cavities in the pad which are provided for setting its rigidity (resilient damping) in transverse or other directions can do this.

SUMMARY OF THE INVENTION

It is therefore an object of the invention to improve an hydraulically-damped mount, and especially one for an engine of the type outlined above, in such a way that the drawbacks mentioned are no longer encountered. Specifically, the engine mount should not be subject to dynamic induration, particularly when vibrations of high frequency are introduced, and should permit low-frequency vibrations to be damped effectively without disturbing noise being generated.

To these and other ends, in the invention, a resilient pad of an hydraulically-damped mount is not part of the walls which bound a space for the hydraulic fluid and cooperative bumper shoulders and counter shoulders in the motional linkage of the mount also are outside the fluid space. The pressure and flow in the fluid therefore will have no effect on these parts. The churning stresses on the fluid are also considerably reduced. The combination of these measures, moreover, allows vibrations below a given amplitude to be damped with the resilient pad alone, i.e. without the hydraulic damping mechanism, and, hence, without the hydraulic fluid being set into motion. For this, the bumper shoulders and counter shoulders define an initial, "free" vibration-response movement in the mount in which only the pad is deflected, only after which does engagement between the shoulders activate the hydraulic damping arrangement in the mount. The initial transmission behavior is thus determined solely by the properties and shape of the resilient pad. With prior-art designs, the hydraulic fluid in the mount was also subjected to motion when vibrations of any frequency and amplitude were introduced. This resulted in the described loss of dynamic resilience, and, hence, in a poorer transmission characteristic. Morever, disturbing cavitation noise might be generated.

With larger amplitudes, after the free path between the bumper shoulders and counter shoulders has been traversed, the shoulders engage to initiate the desired, hydraulic damping. The free path should be dimensioned so that the hydraulic damping mechanism operates only in the lower vibration frequency range of between 0 Hz and about 30 Hz, i.e. with the larger amplitudes practically permitted thereby.

The bumper shoulders and counter shoulders are advantageously disposed in connected or mutually-vented spaces so as to avoid compression limitation of their movement and otherwise constructed so that relative motion is readily possible. At least one of their opposed contact surfaces should, therefore, be concave or relieved to prevent vacuum sticking and thus facilitate release after contact has been made.

A further advantage is that the shape of the resilient pad does not affect the hydraulic damping mechanism in any way. This frees the design of cavities or even openings in the pad for securing desired rigidity and resilience in given directions for support and resilient damping.

Damping layers may be provided between the bumper shoulders and counter shoulders for making the transition from the un-hydraulically-damped free path to hydraulically-damped motion smoother. It has been found advantageous for these damping layers to be elastic knobs which project in the axial direction of the free movement and are bonded to the bumper shoulders and/or counter shoulders.

The bumper shoulders and/or counter shoulders may be displaceable in a guide or entrainment member extending parallel to the direction of the hydraulically-damped motion, a damping element being provided to check the displacement. Different deflections of the mount from different static loadings are thus compensated. The advantages obtained with the proposed design then are effective at all times, irrespective of loading. However, the damping element should not impair the other functions of the mount. In one advantageous embodiment, it consists of friction disks, which optionally may be cylindrical, and which enclose each other and are forced together.

BRIEF DESCRIPTION OF THE DRAWINGS

Preferred embodiments to illustrate but not to limit the invention of the invention will now be described in greater detail with reference to the accompanying drawing, wherein.

DETAILED DESCRIPTION OF THE INVENTION

Hydraulically damped engine mounts are shown in FIGS. 1 to 3 and 5. They have rotational symmetry to occupy little space in a motor vehicle. This defines an axial direction of hydraulically-damped motion which is vertical in the figures.

Each engine mount has, in the upper part of the Figures, a turned steel pedestal 1, 1', etc. Its top, exposed surface has a vertical tapped hole (unreferenced) for fastening to the engine (not shown) to be supported on the mount.

The opposite, lower part of each pedestal has a cylindrical pin (unreferenced) which projects in the direction of the hydraulically-damped motion. Two, spaced bumper shoulders 4, 4', etc. (each a pair) project transversely from the pin on opposite sides of counter shoulder 5, 5', etc. pairs. The lower of these two bumper shoulders 4, 4', etc. is formed by an annular steel disk seated in a groove in the pin so that the bumper shoulders 4, 4', etc. can be positioned straddling the counter shoulders 5, 5', etc. In this regard, even though the engine on the mount is not shown, FIGS. 1 to 3 and 5 contemplate the engine load in showing both bumper shoulders of each pair thereof spaced from the counter shoulders.

Figure 1:
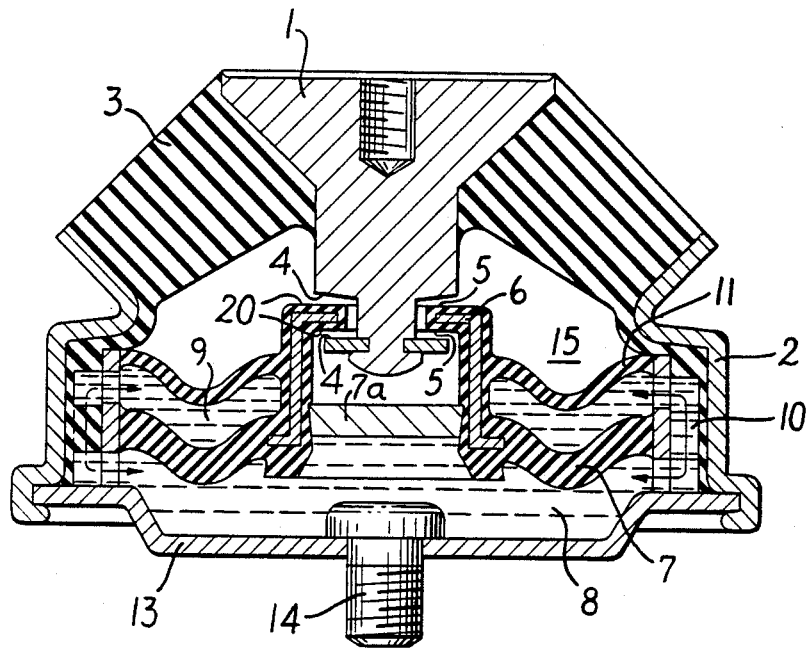
FIG. 1 shows an elevation, partly in section, of a preferred embodiment for an engine mount.
Figure 2:
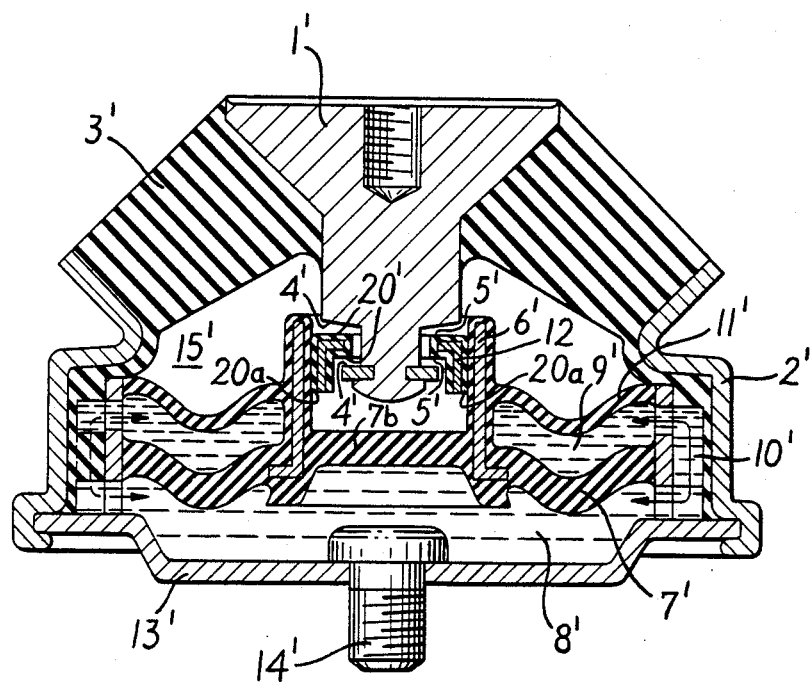
FIG. 2 shows an elevation, partly in section, of another preferred embodiment.
Figure 3:
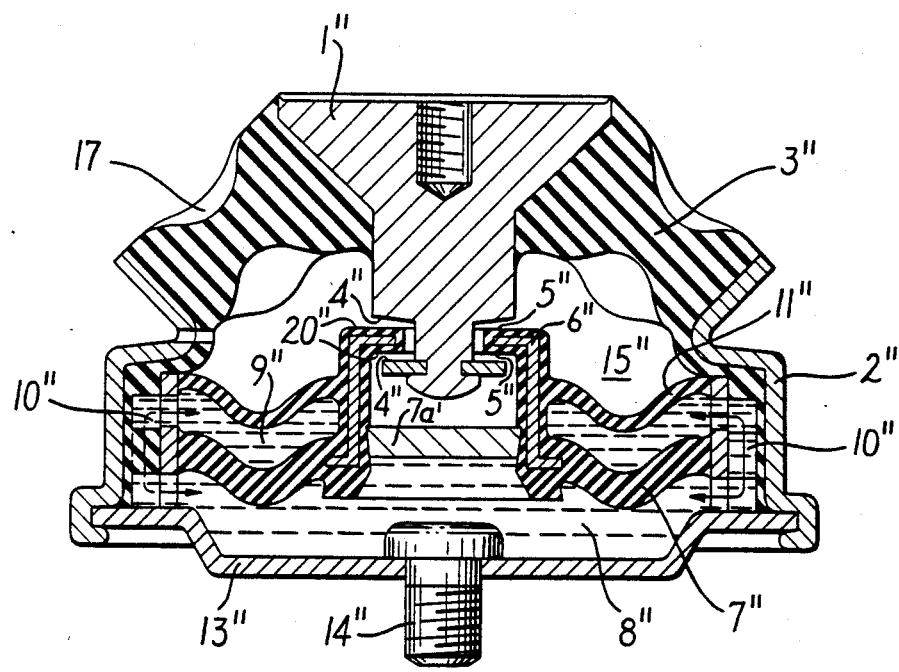
FIG. 3 shows an elevation, partly in section, of another preferred embodiment similar, however, to that of FIG. 1.
Figure 4:
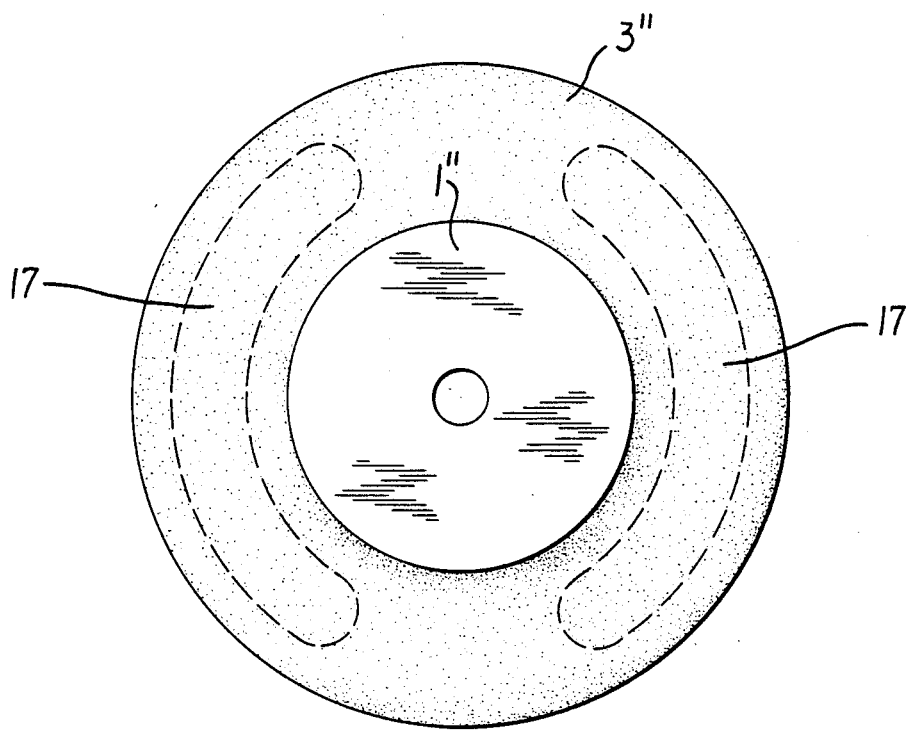
FIG. 4 shows a top view of the embodiment of FIG. 3.
Figure 5:
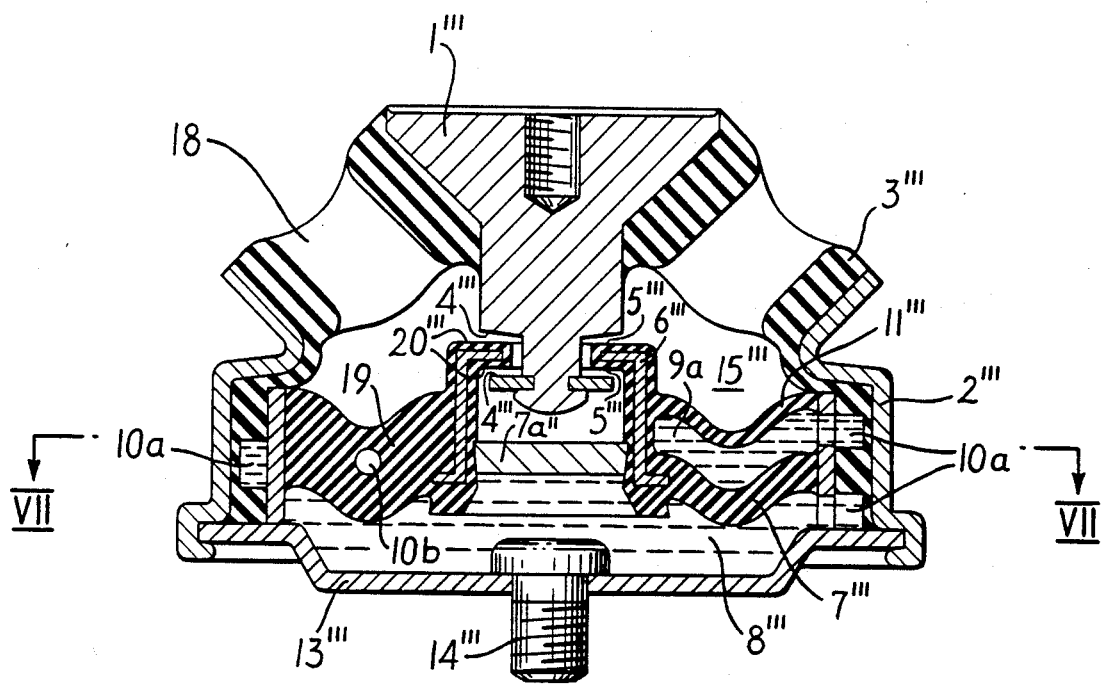
FIG. 5 shows an elevation, partially in section, of another preferred embodiment similar, however, to that of FIG. 3.
Figure 6:
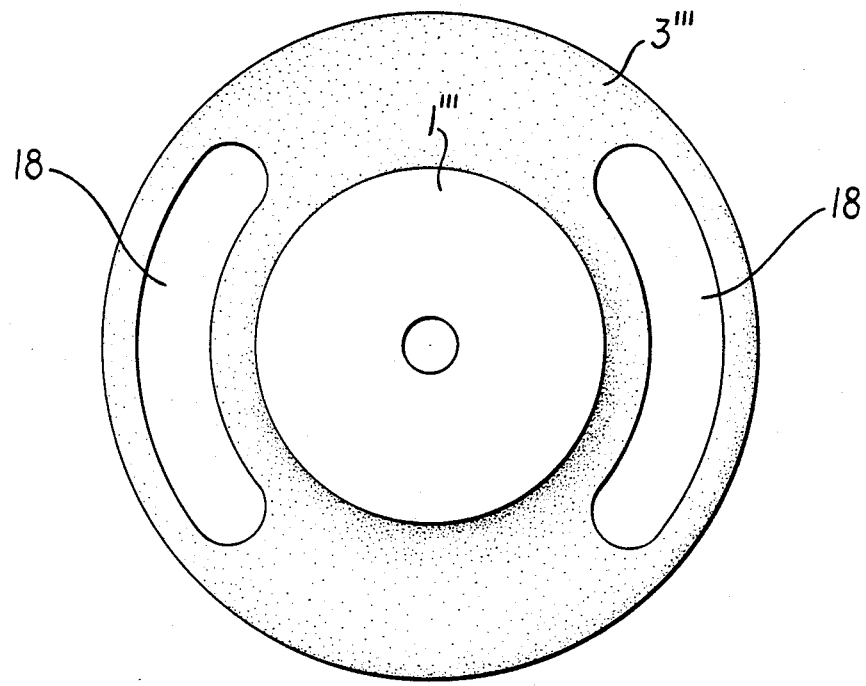
FIG. 6 shows a top view of the embodiment of FIG. 5.

The counter shoulders 5, 5" and 5'" in the embodiments of FIGS. 1, 3 and 5 are integral with an entrainment member 6 6", 6'". The counter shoulders 5' in the embodiment of FIG. 2 slide in the entrainment member 6' an angle ring 12. This is a principal difference between the embodiments.

In FIGS. 1 to 3 and 5, each pedestal 1, 1', etc. is jointed to a mounting bracket 2, 2', etc. by a resilient rubber pad 3, 3', etc. in the form of a hollow cone. Each bracket 2, 2', etc. is of two-part construction with a mounting plate 13, 13', etc. in the lower part of the Figures joined liquid-tight to the remaining, sleeve part of the bracket thereabout. Each plate 13, 13', etc. has a threaded pin 14, 14', etc. for securing the mount to the chassis of a motor vehicle or other support. The two parts of each mounting bracket 2, 2', etc. jointly enclose an arrangement which permits low-frequency vibrations of large enough amplitude to be damped hydraulically.

Figure 8:
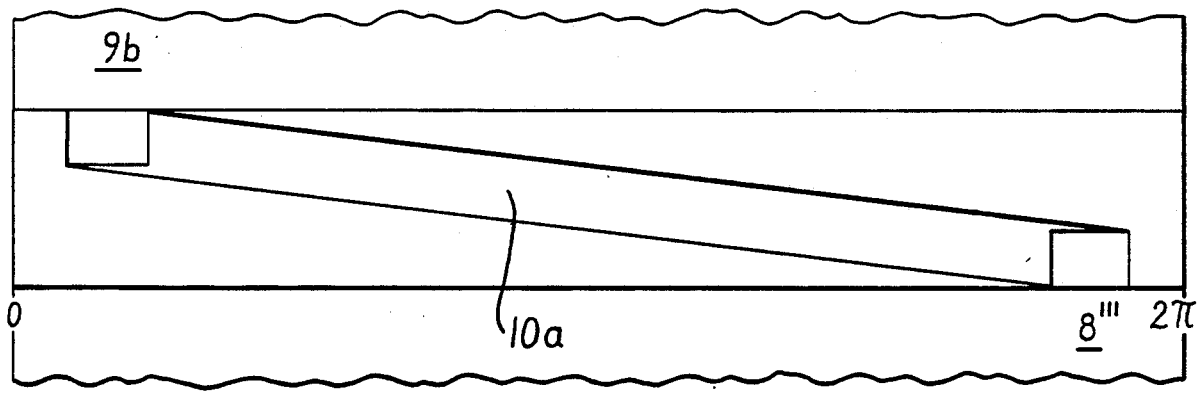
FIG. 8 shows a circumferential portion of the embodiment of FIG. 5 schematically.

To this end, each entrainment member 6, 6', etc. is secured to a flexible, preferably-elastic diaphragm 7, 7', etc. which, together with a plug 7a, 7a', 7a" in FIGS. 1, 3 and 5 and a damping extension 7b of the diaphragm in FIG. 2, a portion of the pad 3, 3', etc. and the mounting bracket plate 13, 13', etc., encloses at least one working space 8, 8', etc. and expansion space 9, 9', etc. or 9a, 9b for hydraulic fluid. Each working space is connected to each corresponding expansion space through at least one peripheral throttle opening 10, 10' 10" or 10a defined by a portion of the pad 3, 3', etc. FIG. 8 schematically shows one throttle opening 10a circumferentially.

Each expansion space 9, 9', etc. 9a or 9b is located between the respectively corresponding working space 8, 8', etc. and resilient pad 3, 3', etc. in the direction of the pin and hydraulically-damped motion but is vibrationally isolated from the pad 3, 3', etc. by a delimiting overleaf 11, 11', etc. of diaphragm 7, 7', etc. and gas-filled hollow space 15, 15', etc., as shown, into which the flexible, preferably-elastic overleaf 11, 11', etc. can expand the expansion space. As a result, the resilient pads 3, 3', etc. are not affected in any way by the liquid in the working and expansion spaces of the motionally-succeeding hydraulic-damping mechanism. The pads thus defined an initial (or final) vibration-response movement free of hydraulic damping.

As previously indicated, the design of the resilient pad 3, 3', etc. can have cavities 17 as in FIG. 3 or even openings 18 as in FIG. 5 for securing desired rigidity and resilience in given directions. The openings 18 (FIG. 5) also permit the expansion space 15'" to communicate with the outside air so that pressures cannot build up in the expansion space 15'" when the pedestal 1'" and pad 3'" are deflected downwardly into the expansion space 15'". Through this or other measures, the resilient pad 3'" is never subjected to forces that might result therefrom. It is also able to rebound freely in any situation.

Similarly, none of the resilient pads 3, 3', etc. has any affect on the hydraulic damping mechanism except with the throttle openings 10, 10', etc. or 10a partly therein, it being understood that the portion of each pad with the throttle openings is held against flexure by the corresponding bracket 2, 2', etc. In other words, the shape of the rest of the pad which flexes with vibrations may be altered as desired without the damping mechanism being affected thereby. For example, if varying degrees of rigidity are required in the longitudinal and transverse directions of the mount, provision can readily be made therefor with local openings 18 or cavities 17 as shown in FIGS. 5 and 3.

Figure 7:
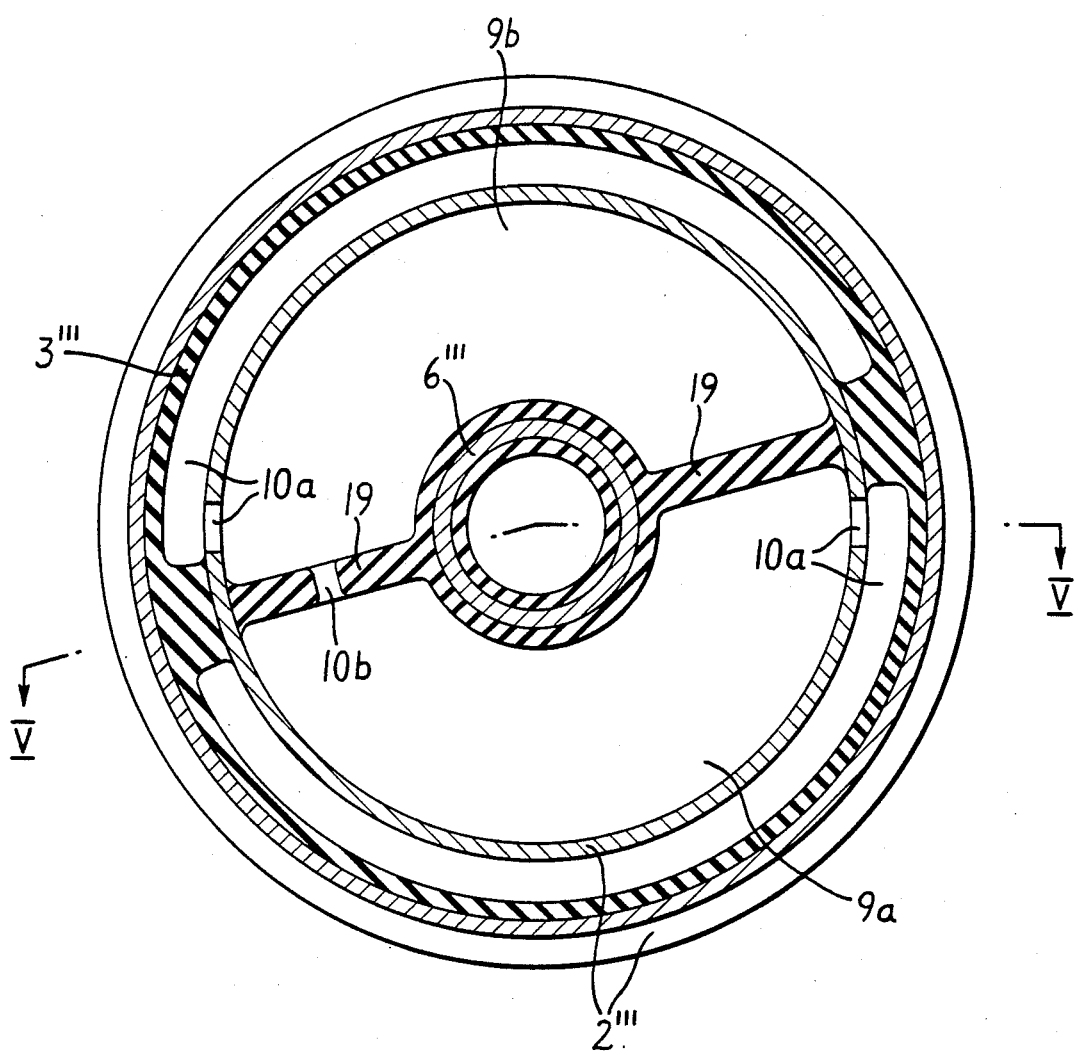
FIG. 7 shows a plan cross section of the embodiment of FIG. 5.

The position of the throttle openings 10, 10', 10" or 10a connecting the working and expansion spaces can be varied. Their cross-sectional areas can also be varied with angular displacement of a nozzle inset (not shown) to control their throttling further and variably. The two throttle openings 10a of the embodiment shown in FIGS. 5 and 7 are helical as shown schematically in FIG. 8. The discharge ends of each throttle opening 10a into the working and expansion spaces also make an angle of approximately 180° with each other. This permits two or more appropriately-constructed throttle openings to be distributed around the circumference and respectively associated with two or more adjacent, internally-partitioned working and/or expansion subspaces like the two expansion spaces 9a, 9b internally partitioned by partition 19 shown in FIG. 7. The two expansion spaces 9a, 9b are interconnected by at least one other throttle opening 10b as shown in FIGS. 5 and 7. In this way, provision is made for also damping hydraulically horizontal directional components (e.g. tilting) when liquid is transferred from the bottom expansion space 9a to the top, 9b in FIG. 7, for example.

The operation of the above-described engine mounts may now be described. In each, when vibrations of sufficiently small amplitude are introduced between the pedestal 1, 1', etc. and bracket 2, 2', etc. the entire relative motion is absorbed solely by the resilient pad 3, 3', etc. There is no transmission of motion between the bumper shoulders 4, 4', etc. and counter shoulders 5, 5', etc. so long as the amplitude of the vibrations remains smaller than the space therebetween. The vibrations are thus readily isolated resiliently in the pad 3, 3', etc.

However, when low-frequency vibrations of sufficiently large amplitude are introduced, one of the bumper shoulders 4, 4', etc. comes to bear on one of the counter shoulders 5, 5', etc. to transmit the resulting motion to the entrainment member 6, 6', etc. and thus to the connected diaphragm 7, 7', etc. This activates the hydraulic damping mechanism.

For example, with reference to the embodiments according to each of FIGS. 1 and 2, when the pedestal 1, 1' moves toward the bracket 2, 2' (downwardly) sufficiently for the shoulders to bear on each other, the resulting downward movement of the diaphragm 7, 7' forces some hydraulic fluid from the working space 8, 8' through the throttle opening 10, 10' into the expansion space 9, 9'. To accommodate this additional fluid, the overleaf 11, 11' separating the expansion space 9, 9' from the pad 3, 3' is forced, preferably elastically, into the hollow space 15, 15' therebetween. This throttled transfer of fluid from the working space 8, 8' into the expansion space 9, 9' provides the hydraulic damping and, because the overleaf 11, 11' deflects into the hollow space 15, 15', does so without affecting the support of the pedestal 1, 1' from the resilient pad 3, 3'. When the vibrational force allows the pedestal to rebound upward, away from bracket 2, 2' under the resilience of the pad 3, 3' and, preferably, the elasticity of diaphragm 7, 7' and its overleaf 11, 11', the volume of liquid contained in the expansion space 9, 9' is forced back through the throttle opening 10, 10', into the working space 8, 8'. This, too, results in appropriate hydraulic damping.

Although it is of no consequence to the operation of the engine mount that the expansion space 9, 9' is located between the working space 8, 8' and the resilient pad 3, 3', this arrangement makes for a space-saving design and for economical manufacture and therefore is preferred. A different arrangement is readily possible, however.

The operation of embodiment according to FIG. 2 is substantially the same as that of FIG. 1. The only difference is in the sliding, operative connection of the counter shoulders 5' and the entrainment member 6' of FIG. 2 as opposed to the fixed, operative connection therebetween of FIG. 1. The entrainment member 6' thus comprises a guide sleeve which extends in the direction of axial hydraulically-damped motion for sliding fit with the angle ring 12 therein providing the counter shoulders 5'. When the static load between the pedestal 1' and pin 14' is increased, as when a heavier engine is mounted, therefore, the angle ring 12 slidingly shifts in the guide-sleeve entrainment member 6' to assume a position corresponding to the compressive resistance of the resilient pad 3' to the increased static load on the pedestal 1'. The sliding fit is sufficiently tight, however, that it will thereafter substantially remain in that position under operating conditions (after reaching an average spacing between the bumper shoulders 4'). For this, at least one rubber damping layer 20a is provided in the sliding fit between the counter shoulder ring 12 and the entrainment member 6'. The damping extension 7b of the diaphragm 7' in the embodiment for FIG. 2 as a replacement of the plug 7a of FIG. 1 functions to limit the sliding movement.

The further operation of the embodiment of FIG. 2 fully corresponds to that described for the embodiment according to FIG. 1. Thus, high-frequency vibrations of small amplitude which do not cause the bumper shoulders 4' and the counter shoulders 5' to touch each other are absorbed and isolated simply by the resilience of the resilient pad 3'. Only vibrations of larger amplitude will cause the bumper shoulders and counter shoulders to contact and operate the hydraulic damping system as described above.

In FIGS. 1 to 3 and 5, the counter shoulders 5, 5' etc. as covered with rubber damping layers 20, 20' etc. on the surfaces which engage the bumper shoulders 4, 4' in the hydraulic damping operation. These damp the sound and impact of the engagement which can be substantial because the mount is vibrationally responsive. It is, however, of course, equally sufficient to arrange the damping layers also or alternatively on the bumper shoulders 4, 4' or independently between the shoulders 4, 4' and counter shoulders 5, 5' in other ways.

Figure 9:
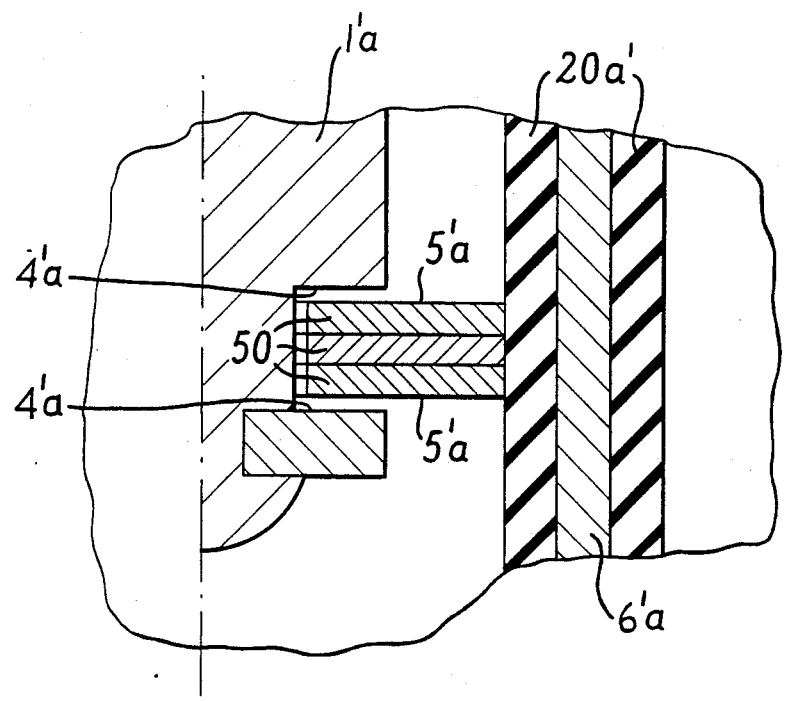
FIG. 9 shows an enlarged, partial cross section of another preferred embodiment similar, however, to that of FIG. 2.

In another embodiment similar to that of FIG. 2 and shown partially in FIG. 9, the counter shoulders 5'a are formed by a pack of three lamins 50 which, as a result, do not require a damping layer (20' in FIG. 2, for example) as in the previously-described embodiments.

Figure 10:
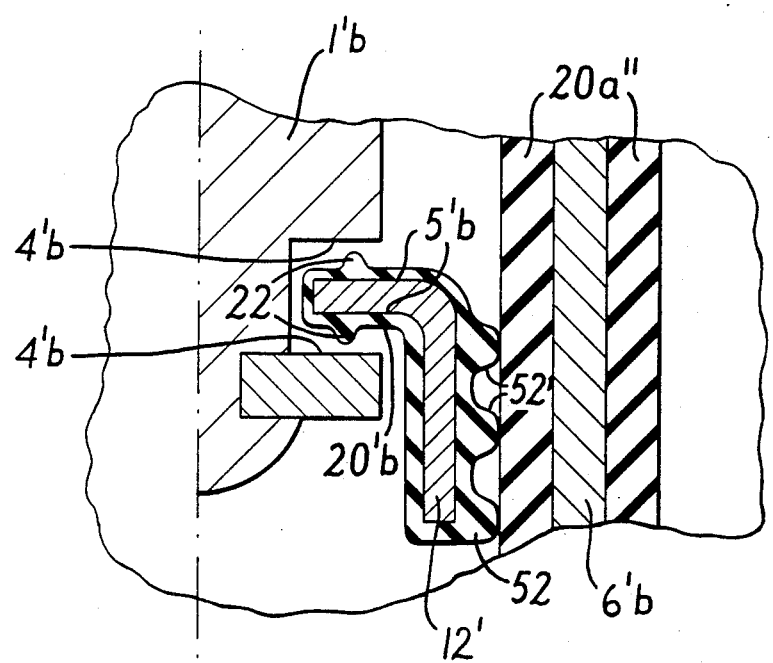
FIG. 10 shows an enlarged, partial cross section of another preferred embodiment similar, however, to that of FIGS. 2 and 9; similar, however, that the FIGS. 2 and 9.

In still another embodiment similar to that of FIG. 2 and shown partially in FIG. 10, the rubber damping layer 20'b on the separate angle ring 12' is provided with knobs 22 which, is another embodiment (not shown), can even replace the rest of the damping layer. These knobs can also project from one or both of the bumper and counter shoulders, but as shown in FIG. 10, project from the counter shoulders 5'b toward the other, bumper shoulders axially of the direction of motion therebetween for activating the hydraulic damping arrangement. For this, the knobs 22 are integrally bonded onto the counter shoulders from which they project. The knobs 22 are preferably elastic. Similar, elastic knobs 52 can be formed, as shown, between the rubber layers 20'b and 20a" to aid the sliding, load-responsive adjustment of the angle ring 12' previously described.

Figure 11:
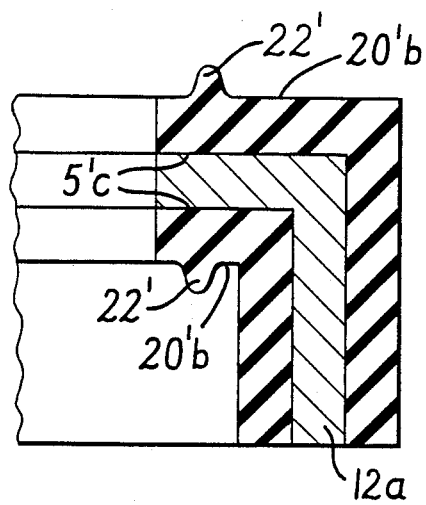
FIG. 11 shows an enlarged, partial cross section of another preferred embodiment similar, however, to that of FIGS. 2, 9 and 10.
Figure 12:
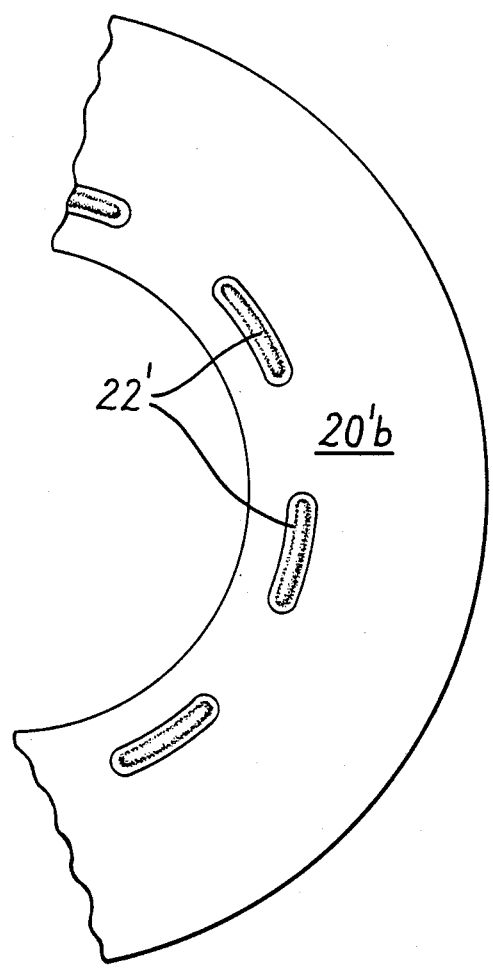
FIG. 12 shows a partial, plan view of the portion of the embodiment of FIG. 11.

In still another embodiment similar to that of FIGS. 2 and 10 and shown partially in FIGS. 11 and 12, the elastic knobs 22' of the rubber layer 20'b on the counter shoulders 5'c are elongated. This provides the knobs with a greater area for contact with the bumper shoulders and a greater elastic mass than non-elongated knobs.

Returning briefly to FIG. 7 showing the engine mount of FIG. 5 in a plan cross-section taken through the expansion space 9, the elastic partition wall 19 is seen to divide the expansion space into two spacial subdivisions 9a, 9b of equal size. Because these partial or sub-spaces are interconnected by the throttle opening 10b which penetrates the partition wall 19, vibrations between the pedestal 1 and bracket 2 which are angled, i.e. have a component in a direction transverse to that between the pedestal and bracket, are correspondingly transmitted to the entrainment member 6. This can result in displacement of the hydraulic fluid through the throttle opening 10b to damp the angled vibrations hydraulically. Such damping will not affect the operation of the engine mount when vibrations are introduced in the vertical (normal) direction between the pedestal and bracket. In that case, the pressures in the sub-spaces 9a, 9b are equal and the hydraulic damping of sufficiently-large, low-frequency, vibrational amplitudes is effected as previously described.

It will be appreciated that the instant specification and claims are set forth by way of illustration and not of limitation, and that various changes and modifications may be made without departing from the spirit and scope of the present invention.

What is claimed is:

1. A mount for hydraulically damping vibrational motion, comprising:
   a pedestal and a mounting bracket for connecting the mount between an object to be mounted with the mount and a support therefor;
   a resilient pad connecting the pedestal and the mounting bracket for the vibrational motion therebetween;
   diaphragm means for flexibly enclosing a working space and an expansion space for an hydraulic fluid with at least one throttle opening for the hydraulic fluid therebetween, the diaphragm means being connected to the mounting bracket and spaced from the resilient pad sufficiently so as not to engage the resilient pad upon flexure thereof with the hydraulic fluid;
   bumper shoulders operatively connected to the pedestal and spaced from each other in the direction of the vibrational motion; and
   counter shoulders operatively connected to the diaphragm means and spacedly positioned between the bumper shoulders for engagement thereby upon sufficient amplitude of the vibrational motion, the bumper shoulders and the counter shoulders being outside the working and expansion spaces for the hydraulic fluid enclosed by the diaphragm means.

2. The mount of claim 1, and further comprising damping means disposed between the bumper shoulders and the counter shoulders for damping the sound and impact of the engagement therebetween.

3. The mount of claim 2, and further comprising at least one partition radially subdividing at least one of the working and expansion spaces enclosed by the diaphragm means into sub-spaces; and a further throttle opening through the partition.

4. The mount of claim 2, wherein the resilient pad is a hollow cone to provide a space in the mount for the diaphragm means spaced from the resilient pad and for the bumper and counter shoulders.

5. The mount of claim 4, and further comprising vent means for venting the space.

6. The mount of claim 2, wherein the damping means comprises knobs projecting from at least one of the bumper and counter shoulders toward the other.

7. The mount of claim 6, wherein the knobs are elastic.

8. The mount of claim 7, and further comprising at least one partition radially subdividing at least one of the working and expansion spaces enclosed by the diaphragm means into sub-spaces; and a further throttle opening through the partition.

9. The mount of claim 7, wherein the resilient pad is a hollow cone to provide a space in the mount for the diaphragm means spaced from the resilient pad and for the bumper and counter shoulders.

10. The mount of claim 9, and further comprising vent means for venting the space.

11. The mount of claim 1 wherein the operative connection of at least one of the bumper and counter shoulders respectively to the pedestal and diaphragm means comprises a guide receiving the shoulders for displacement substantially only by static loads between the pedestal and bracket.

12. The mount of claim 11 wherein the guide comprises an entrainment sleeve slidingly receiving the counter shoulders therein sufficiently tightly for the displacement substantially only by the static loads, and the counter shoulders comprise an angle ring slidingly received therein.

13. The mount of claim 11, and further comprising at least one partition radially subdividing at least one of the working and expansion spaces enclosed by the diaphragm means into sub-spaces; and a further throttle opening through the partition.

14. The mount of claim 11, and further comprising damping means disposed between the bumper shoulders and the counter shoulders for damping the sound and impact of the engagement therebetween.

15. The mount of claim 11, wherein the resilient pad is a hollow cone to provide a space in the mount for the diaphragm means spaced from the resilient pad and for the bumper and counter shoulders.

16. The mount of claim 15, and further comprising vent means for venting the space.

17. The mount of claim 1, and further comprising at least one partition radially subdividing at least one of the working and expansion spaces enclosed by the diaphragm means into sub-spaces; and a further throttle opening through the partition.

18. The mount of claim 17, wherein the resilient pad is a hollow cone to provide a space in the mount for the diaphragm means spaced from the resilient pad and for the bumper and counter shoulders.

19. The mount of claim 18, and further comprising vent means for venting the space.

20. A mount for hydraulically-damping vibrational motion, comprising:
   a pedestal having a surface for connection to one of an object to be mounted with the mount and a support therefor and a pin projecting therefrom;
   a mounting bracket for connection to the other of the object and support;
   a resilient pad connecting the bracket to the pedestal with the pin projecting toward the bracket;
   diaphragm means spaced from the resilient pad for flexibly enclosing a working space and an expansion space for an hydraulic fluid and defining at least one throttle opening for the hydraulic fluid therebetween, the diaphragm means being spaced from the resilient pad so that the flexing thereof does not affect the resilience of the resilient pad;
   a pair of spaced bumper shoulders projecting transversely from the pin;
   a pair of counter shoulders between and spaced from the bumper shoulders for engagement thereby upon sufficient amplitude of the vibrational motion, the bumper and counter shoulders being outside of the working and expansion spaces for the hydraulic fluid enclosed by the diaphragm means, whereby their vibrational motion does not affect the hydraulic fluid; and
   means for operatively connecting the counter shoulders to the diaphragm means, whereby vibrational motion between the pedestal and the bracket sufficient to engage the bumper and counter shoulders flexes the diaphragm means for throttling the hydraulic fluid from the working space into the expansion space, thereby hydraulically damping further vibrational motion.

* * * * *